United States Patent
Dirgo et al.

(10) Patent No.: US 10,787,156 B2
(45) Date of Patent: Sep. 29, 2020

(54) AIRCRAFT BRAKE AND TIRE CONDITION DIAGNOSIS AND PROGNOSIS

(71) Applicant: Meggitt Aircraft Braking Systems Corporation, Akron, OH (US)

(72) Inventors: Robert T. Dirgo, Cuyahoga Falls, OH (US); Ravi Rajamani, West Hartford, CT (US); Kurt Burkhalter, Akron, OH (US); Joshua H. Adams, Copley, OH (US); Douglas D. Moseley, Uniontown, OH (US); Kyle J. Hamblin

(73) Assignee: Meggitt Aircraft Braking System Corporation, Akron, OH (US)

( * ) Notice: Subject to any disclaimer, the term of this patent is extended or adjusted under 35 U.S.C. 154(b) by 0 days.

(21) Appl. No.: 15/766,601

(22) PCT Filed: Oct. 6, 2016

(86) PCT No.: PCT/US2016/055705
§ 371 (c)(1),
(2) Date: Apr. 6, 2018

(87) PCT Pub. No.: WO2017/062590
PCT Pub. Date: Apr. 13, 2017

(65) Prior Publication Data
US 2018/0290639 A1    Oct. 11, 2018

Related U.S. Application Data

(60) Provisional application No. 62/238,363, filed on Oct. 7, 2015.

(51) Int. Cl.
*B60T 8/88*   (2006.01)
*B60T 17/22*  (2006.01)
*B64F 5/60*   (2017.01)

(52) U.S. Cl.
CPC .............. *B60T 8/885* (2013.01); *B60T 17/22* (2013.01); *B60T 17/221* (2013.01); *B60T 2270/406* (2013.01); *B64F 5/60* (2017.01)

(58) Field of Classification Search
None
See application file for complete search history.

(56) References Cited

U.S. PATENT DOCUMENTS

| | | |
|---|---|---|
| 5,582,390 A | 12/1996 | Russ |
| 7,293,524 B2 | 11/2007 | Darby |

(Continued)

FOREIGN PATENT DOCUMENTS

| | | |
|---|---|---|
| CA | 2487704 | 5/2006 |
| EP | 0 960 811 | 12/1999 |

(Continued)

OTHER PUBLICATIONS

Bahrami, A., Airworthiness Directives; Bombardier, Inc. Model BD-100-1 A10 (Challenger 300) Airplanes, Department of Transportation, Federal Aviation Administration, Federal Register, vol. 77, No. 66, Apr. 5, 2013, 3 pages.

*Primary Examiner* — Thomas G Black
*Assistant Examiner* — Demetra R Smith-Stewart
(74) *Attorney, Agent, or Firm* — Renner, Kenner, Greive, Bobak, Taylor & Weber Co., L.P.A.

(57) ABSTRACT

A method of diagnosis and prognosis for various operative systems is provided so that maintenance can be efficiently and effectively scheduled and provided. The invention is applicable to a broad range of systems, but particularly to aircraft brake systems and tires. An aircraft brake may be modeled by attributing brake wear factor values to various parameters associated with the aircraft brake that impact wear. Over the course of time and during braking events, the brake wear factor values are summed and a running total of that sum is kept over the life of the brake. At a point in time (Continued)

when the sum of weighted factors exceeds a preset threshold, an indicia is generated that service is required.

7 Claims, 2 Drawing Sheets

(56) References Cited

U.S. PATENT DOCUMENTS

| | | | |
|---|---|---|---|
| 7,877,216 B2 | 1/2011 | Wright | F16D 66/02 |
| 8,041,490 B2 | 10/2011 | DeVlieg | |
| 8,152,246 B2 | 4/2012 | Miller | B60T 17/22 |
| 8,291,782 B1 | 10/2012 | Shaheen et al. | |
| 8,634,971 B2 | 1/2014 | Cahill | B60T 8/00 |
| 8,773,289 B2 | 7/2014 | Maggiore | G08G 5/008 |
| 8,918,291 B2 | 12/2014 | Tallot et al. | |
| 9,242,628 B2 | 1/2016 | Mylaraswamy | B60T 17/22 |
| 9,663,223 B1* | 5/2017 | Harrison | B64O 25/426 |
| 10,234,012 B1 | 3/2019 | Latif | F16H 57/01 |
| 2004/0187556 A1 | 9/2004 | Abe | G01N 19/02 |
| 2008/0201025 A1 | 8/2008 | Dellac et al. | |
| 2010/0286881 A1* | 11/2010 | Cahill | B60T 8/00 701/70 |
| 2011/0048147 A1 | 3/2011 | Keech | B64C 5/02 |
| 2011/0127375 A1 | 6/2011 | Tallot | B64C 5/10 |
| 2011/0144879 A1 | 6/2011 | Miller et al. | |
| 2013/0131888 A1* | 5/2013 | Nutaro | G08G 5/0021 701/1 |
| 2014/0058621 A1 | 2/2014 | Fagot-Revurat | |
| 2014/0257603 A1* | 9/2014 | McKeown | B64D 45/00 701/16 |
| 2015/0081394 A1* | 3/2015 | Esposito | G06Q 30/0206 705/7.35 |
| 2016/0163130 A1* | 6/2016 | Zagajac | G07C 5/0808 701/29.1 |

FOREIGN PATENT DOCUMENTS

| | | |
|---|---|---|
| EP | 0 983 937 | 3/2000 |
| EP | 1 245 867 | 10/2002 |
| FR | WO 2010/140370 | 10/2012 |
| GB | 2470098 | 11/2010 |
| WO | WO 96/21145 A1 | 7/1996 |

\* cited by examiner

AIRCRAFT BRAKE AND TIRE CONDITION DIAGNOSIS AND PROGNOSIS

CROSS-REFERENCE TO RELATED APPLICATION

This application claims priority to U.S. Provisional Patent Application Ser. No. 62/238,363, filed Oct. 7, 2015.

FIELD OF THE INVENTION

The invention herein resides in the art of a diagnostic methodology for monitoring the operation of a piece of equipment and providing a prognosis as to when service is required. More particularly, the invention relates to a method for diagnosing the wear of aircraft parts and providing a prognosis for serviceability of those parts. Specifically, the invention relates to a method for the diagnosis of aircraft brakes and tires and the development of a prognosis pertaining to their serviceability.

BACKGROUND OF THE INVENTION

Aircraft brakes and tires wear out in an uneven fashion based on many factors such as load on the aircraft, force of brake application, ambient conditions, length of runway, condition of runway, and the like. Traditionally, the only way to estimate brake wear has been to physically measure the length of the wear-pin, which is essentially a metal pin that is attached to the back of the brake pressure plate and sticks out through a hole in the assembly. As the brake face gets worn out, the plate is pressed further and further inward when pressure is applied, until such time that the pin is minimally (or no longer) visible. This is an indication that the brake needs to be replaced. Typically, airlines maintain many spare brake stacks at their depots so that airline personnel can replace the brake stack if the wear pin inspection so indicates. However, to be able to respond to an uncertain demand of replacement brakes, the depot has to maintain many spares. This leads to tied up cost in spares inventory. Similarly, tires are inspected periodically to ensure that the tread is of sufficient thickness to assure a safe grip on the tarmac and ensure airplane safety. The maintenance personnel visually inspect the tire surface to ensure that the grooves (typically four in number around the tire) are of sufficient depth all the way around the tire circumference. If the grooves (or parts thereof) have eroded away, it is an indication that the tire needs to be changed. To ensure that an aircraft is not held up for the lack of a spare part, the depot maintains many pre-mounted tires on wheels so that a wheel assembly can be swapped out during a maintenance shift.

If it were possible to predict accurately when brakes will wear out ahead of the lead-time for ordering a spare brake stack, this extra inventory could be reduced considerably, thereby ensuring economic operation of brake service and inventory. The same logic applies to tires (and other expendable aircraft parts) as well.

Additionally, by sharing this information with the manufacturing shop, just-in-time manufacturing can take place, again reducing work in process (WIP) in the manufacturing line.

Finally, if there is an analytical way of estimating wear, the number of visual inspections of the pin can be reduced, thereby reducing the cost of inspection as well.

Any methodology for monitoring brake wear must necessarily take into account a host of parameters that can impact brake wear and weigh those parameters as to their degree of impact on brake wear so that any prognosis for service is sufficiently accurate to assure that the methodology of the invention does not frustrate its intent. By the same logic, if there is an analytical way of estimating tire tread wear then an estimate can be made of when a tire (in normal service) will need to be replaced. This will allow for the right number of tires to be ordered at the right time, and obviate the necessity of maintaining a large spares inventory.

SUMMARY OF THE INVENTION

In light of the foregoing, it is an aspect of the invention to provide a methodology of diagnosis and prognosis for aircraft brake systems and tires that reasonably predicts the need for spares replacement.

Another aspect of the invention is the provision of an aircraft brake condition diagnosis and prognosis system that can acquire, consider and apply a wide variety of parameters impacting brake wear in order to effectively predict when brake service is required.

Still a further aspect of the invention is the provision of an aircraft brake condition diagnosis and prognosis system that provides for the development of a model of a particular brake assembly, followed by the actual monitoring of a brake assembly corresponding to that model, measuring the data from the brake assembly against the model.

Yet another aspect of the invention is the provision of an aircraft brake condition diagnosis and prognosis system that can ensure economic serviceability of aircraft brakes on a just-in-time basis, minimizing costs and consistent with the effective operation of an airline.

An additional aspect of the invention is the provision of an aircraft tire condition diagnosis and prognosis system of the type described in detail herein with regard to aircraft brakes, but with concentration on those parameters specifically impacting tire wear.

The foregoing and other aspects of the invention that will become apparent as the detailed description proceeds are achieved by a method of diagnosis and prognosis for aircraft brakes, comprising: establishing a model of an aircraft brake by attributing brake wear factor values to various parameters associated with the aircraft brakes; summing magnitudes of said brake wear factor values over a course of time during which actual in-use braking events occur, keeping a running total sum of said brake wear factor values; and providing a first indicia of service necessity when said running total sum exceeds a first threshold.

Other aspects that will become apparent herein are achieved by a method of diagnosis and prognosis for aircraft tires, comprising: establishing a model of an aircraft tire by attributing tire wear factor values to various parameters associated with the aircraft tires; summing magnitudes of said tire wear factor values over a course of time during which tire wear events occur; keeping a running total sum of said tire wear factor values; and providing an indicia of service necessity when said running total sum exceeds a first threshold

BRIEF DESCRIPTION OF THE DRAWINGS

For a complete understanding of the various aspects and features of the invention, reference should be made to the following detailed description and accompanying drawings wherein.

DETAILED DESCRIPTION OF PREFERRED EMBODIMENTS

Figure 1:
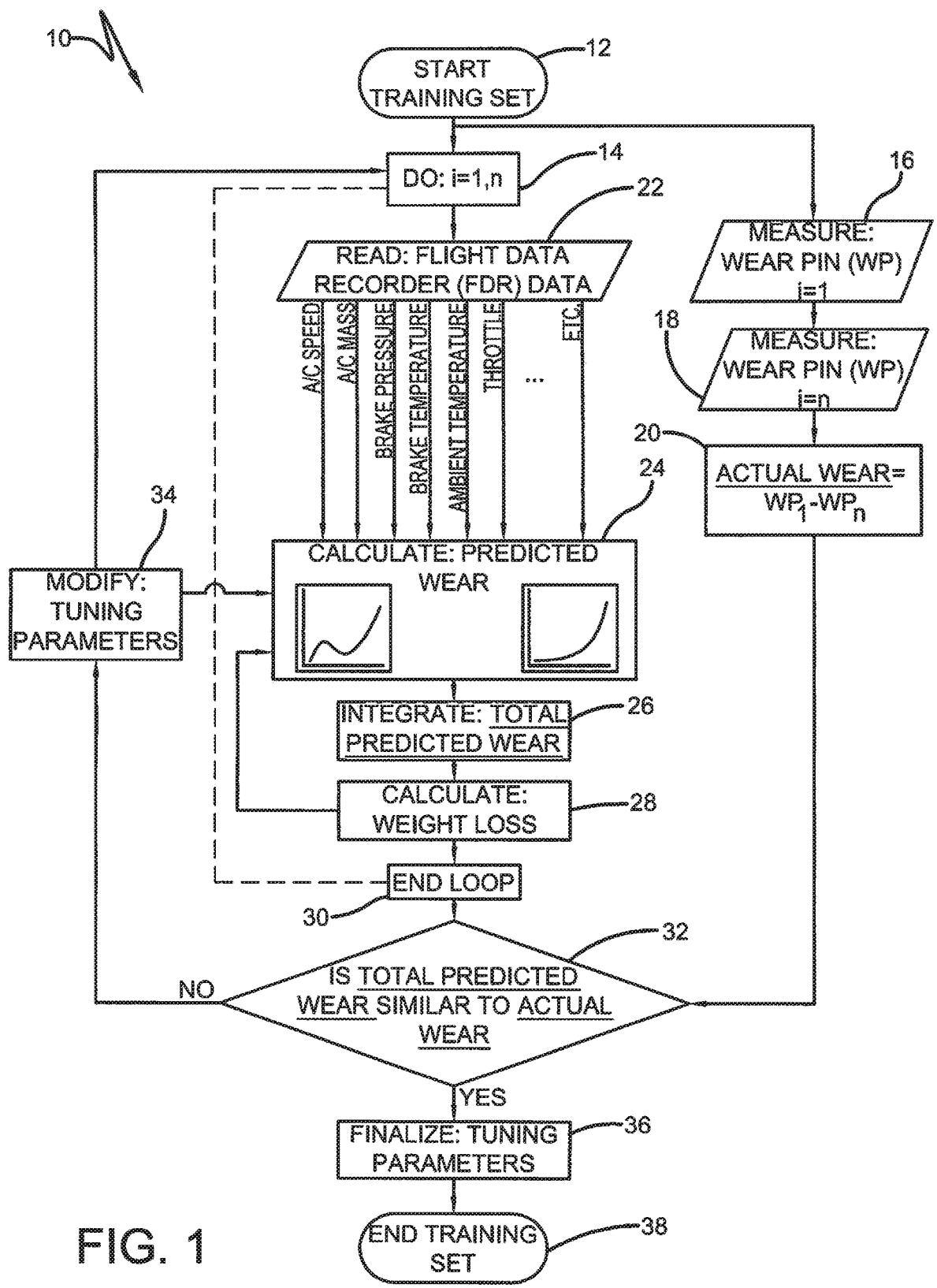
FIG. 1 is a flow diagram of the technique employed for generating a reference or training model of aircraft brake wear.

The concept of the invention is to use existing data to estimate brake wear and use this estimate to predict when brakes will need to be replaced. This leads to a novel approach for logistics optimization for the spare-part supply chain. Hence, there are two aspects to this invention: a health monitoring aspect and a related logistics optimization aspect. It will further be appreciated that this invention is applicable to other limited-life components as well, but in the following description, attention is given primarily to brakes, with some correlated attention to tires. Persons skilled in the art can extrapolate this to other life-limited parts with modifications.

The invention contemplates that the health of an aircraft brake may be evaluated in real time through analysis of relevant performance data and supplemented by environmental condition data. The idea is that brakes wear out in a rather predictable fashion if all relevant input factors and operational parameters are known. If some influencing parameters are not known, or if there is uncertainty in the information, it is contemplated that the error in prediction will be negligible enough that sufficient benefit can still be derived in the supply chain. While the invention can never be 100% accurate due to anomalies and the like, verification of the major data sources can ensure accuracy sufficient for signalling a need for service.

The invention contemplates an extensive dataset to estimate wear every time the brakes are applied, including the following: brake hydraulic pressure; brake temperature; wheel speed, aircraft lateral accelerations; pilot brake pedal position/angle (left and right); park status; thrust reverser status; ICAO (International Civil Aviation Organization) airport code; flap position; time and date. This data set will be derived from a combination of privately held data and publically available data. To help calibrate a model to a specific aircraft, periodic measurements of the brake wear-pin length are taken each time a brake inspection is conducted.

The invention derives a prediction for brake service/replacement through a predictive analytics algorithm that is unique to the particular brake and its operating conditions. The basis for this algorithm may be a model that is used to predict brake wear during testing. During the development of the brakes, extensive tests may be carried out on the brakes with varying loads, temperatures, and the like. The results may be collected and a regression model built. This can form the basis of a prediction algorithm.

Knowing the ICAO code for an airport along with its weather conditions (available from public databases) is informative as to the likelihood for the presence of snow/ice and external factors such as de-icing fluid. Since brakes can wear more or less based on the presence of these external factors, and the influence has been calibrated during test, this can be brought in to influence the prediction. Indeed, it is now known that de-icing fluid can greatly accelerate the degradation of the carbon in carbon disk heat sinks. Such catalytic oxidation resulting from the use of certain runway de-icers accelerates the heat sink mass loss allowing brakes to fail in a relatively short number of landings. Accordingly, knowing or deducing the number of runway de-icer fluid exposures and the number and nature of landings or brake events, catalytic weight loss can be extrapolated and timely inspection undertaken.

There are two embodiments of the inventive system. One is onboard the aircraft and the other is offboard. For the system to reside onboard, it has to operate without some of the external data sources, and the estimates may not be as accurate; the offboard embodiment will typically be more accurate. Where to host the algorithm depends on many factors, including the customer preference, the availability of processing power and memory on the brake controller on the aircraft, and the ability to interact with it in a timely fashion. A more easily implemented embodiment is that where the algorithm resides on the ground, i.e., offboard, preferably at the brake supplier. The service can then be turned on or off depending on whether the customer (the airline) wants to enter into a service contract with the brake supplier.

There is provided a periodic calibration of the analytic algorithm based on the physical measurement of the wear pin. Each brake stack has two pins that can be measured during an overnight hanger visit. This can be fed to the algorithm and the algorithm can calibrate itself to take these readings into account. Adjustment parameters exist in the algorithm to do just this.

According to the invention, the above beneficial prognostic brake wear estimates may be used to enable the optimization of an airline's logistics associated with ordering, transportation, holding, and installing of spare brakes. This optimization includes the streamlining of the logistical flow and a minimization of non-value-added activities utilized to support an operating system that is deficient in effective prognostics.

In use, when an estimate of brake wear is obtained by the system of the invention, and a record of these estimates (calibrated as necessary) is obtained, the system extrapolates these readings into the future. This may be by polynomial regression, but other means can be employed, which will be apparent to those skilled in the art in light of the foregoing.

The extrapolated function is compared to predetermined thresholds to assess when the brake thickness will be small enough to warrant a change. Two thresholds are established; an ordering threshold and a replacement threshold. Typically, the ordering threshold is the point at which an order for the spare is generated. However, because of contractual constraints, this may not take place automatically. An airline representative may have to take the necessary action.

After the order has been placed, the analytics continue to function to extrapolate the brake wear estimates to see when it crosses the more serious threshold where it becomes unsafe to operate the brake. As this date approaches, the system will notify the operator to get ready for the change. Because of this forewarning, the operator does not have to maintain a large "safety" stock of spares. The operator can save space and money by resorting to a just-in-time inventory ordering system.

As to the brake manufacturer/supplier, more manageable inventory levels can be maintained because the brake manufacture can start only when the order is received. Since the order will arrive a few days before the lead-time of manufacture, manufacturer/supplier will also be able to follow a just-in-time manufacturing philosophy. This will allow the inventory to be optimized at both locations, thereby reducing storage costs and increasing cash flow for other aspects of the business.

While the invention herein has been described in the context of servicing aircraft brake assemblies, using similar data acquisition and assessment techniques, the invention can be expanded to a variety of aircraft subsystems. Indeed, the concept is readily adaptable to diagnosis and prognosis of tire wear and requisite service/replacement. While the concept of the invention is substantially the same for both brakes and tires, the parameters impacting wear on each, and the relative significance of those factors will differ.

As presented above, and in the context of a brake wear system, the invention contemplates the development of a model referred to herein as a wear training model which may then be used as a standard to develop a process for assessing real-time wear and determining when the servicing of the brake is required.

With reference now to FIG. 1, the methodology for developing the wear training model is shown and designated generally by the numeral 10. Here, a training model is generated by taking measurements and acquiring data from a brake assembly corresponding to one intended for actual use on aircraft. The process begins at 12 and enters a "DO" loop 14 where a number (n) of brake iterations are undertaken and brake wear assessments made. At the beginning of the cycle, a measurement is made at 16 of the length of the wear pin of the brake assembly where the number of iterations (i) is 1. At the end, on the last iteration, the wear pin is again measured at 18 and the actual wear experienced during the n iterations is calculated at 20 by subtracting the final wear pin length from the initial wear pin length.

The invention contemplates acquiring data on each of n braking events through the reading of a flight data recorder 22. A braking event may be the application or release of brake pressure during landing or taxiing. On each brake event, the flight data recorder obtains data regarding aircraft speed, the known aircraft mass, the brake pressure applied, the brake temperature or temperature of the heat stack, ambient temperature, throttle position, and any of a number of other parameters. That data is provided to a calculation block 24 where the kinetic energy dissipated as a consequence of the brake event is calculated from the data of the flight data recorder 22 and, from a look-up table stored at 24, a determination is made as to the wear experienced by the brake disk stack as a consequence of the kinetic energy dissipated. Similarly, at 24, a determination is made as to the weight loss from the heat sink resulting from oxidation. This determination is made based upon a determination of the mass of the heat stack determined from the prior braking event.

Predicted wear from the braking event and oxidation is determined at 24 for each braking event and is passed to an integrator or summer 26 where that value is added to the prior summed values of predicted wear. A calculation of weight loss is made at 28 and passed back to the integrator or summer 24 to provide a new basis for determining a weight loss due to oxidation.

After a preset number of iterations, one for each braking event, the assessment ends at 30 and a decision is made at 32 whether the total predicted wear calculated at 26 falls within an acceptable range of the actual wear determined at 20 from the wear pin. If not, the weighting of the various parameters read by the flight data recorder at 22 is adjusted or tuned at 34 and the process continues again as at 14.

It will be appreciated that each of the various parameters that is considered at the calculation block 24 is provided a particular weight or multiplier as to how that parameter influences brake wear. The modifications at 34 are made in order to bring the final model into substantial compliance with an actual brake. Accordingly, the process renews through 14-32 with the modified parameters and weighting of the same until the actual wear at 20 is in substantial compliance with the predicted wear as determined at 32. When such has been determined to be the case, the final tuning parameters are set as at 36 and the model is determined by ending the training set at 38.

Figure 2:
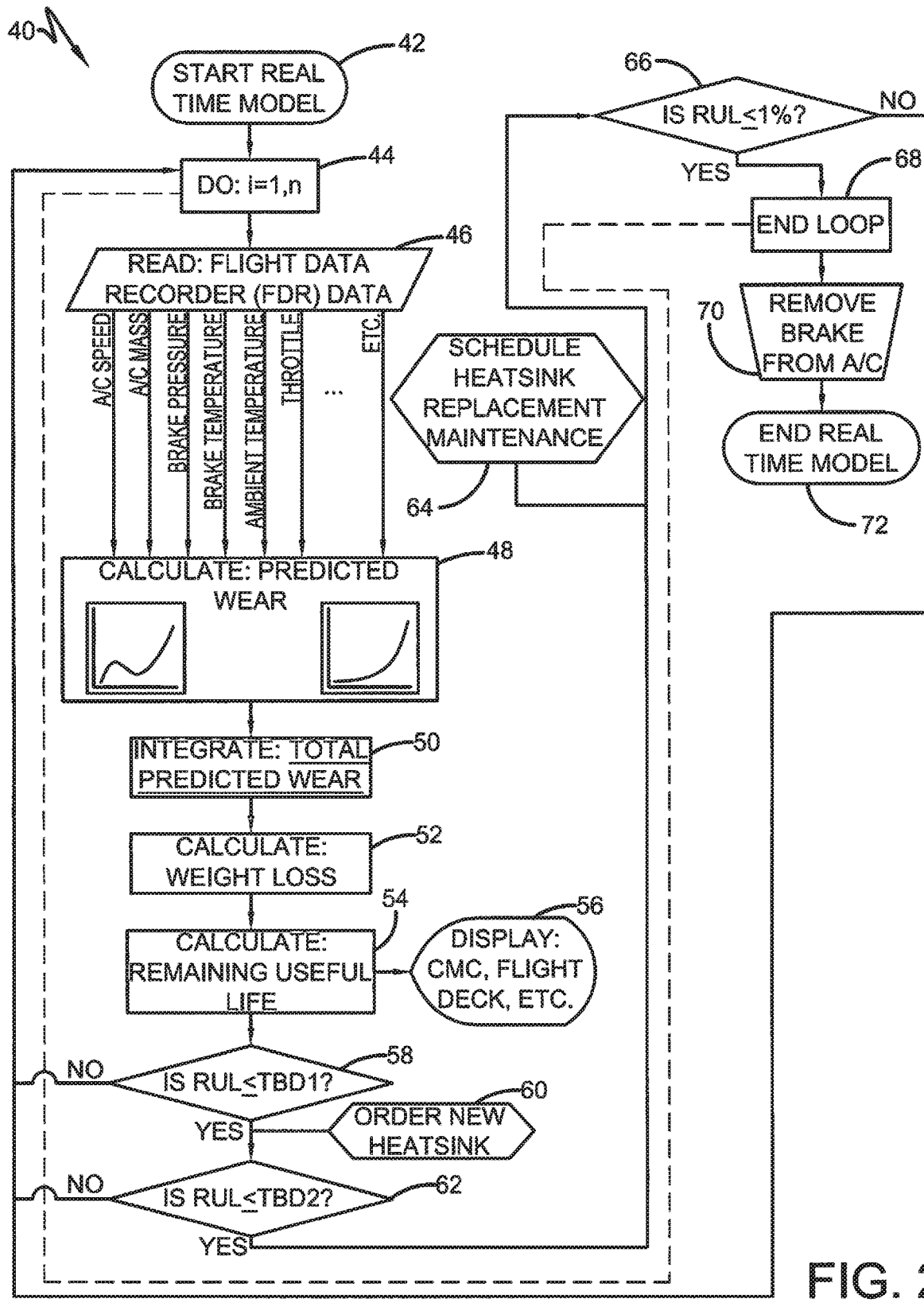
FIG. 2 is a flow diagram of the utilization of the model developed in FIG. 1 and the application of monitoring, diagnosing, and prognosing aircraft brakes in use on an aircraft.

With reference now to FIG. 2, the real-time wear model is assessed through the process designated generally by the numeral 40. Here, an actual brake assembly on an aircraft is monitored, diagnosed and made the subject of a prognosis of when the brake must be replaced. The model generated from the process 10 of FIG. 1 is employed to set the various weights to be given to the parameters of aircraft speed, aircraft mass, brake pressure, brake temperature, ambient temperature, throttle position, and the like in determining the impact of an associated braking activity upon brake wear. The process begins at 42 and continues in a loop 44 until the process is completed with the removal and replacement of the aircraft brake. At 46, the various parameters just described are read from the flight data recorder and fed to the calculating step 24 where the kinetic energy associated with the brake event is calculated as from a look-up table or the like. Similarly, weight loss or effective wear resulting from oxidation is also calculated as a function of the present brake stack mass. Total predicted brake wear is then determined at 50 and the weight loss determined at 52 and fed back to the calculating step 48 for the next prediction of loss due to oxidation.

With the total predicted wear having been summed or integrated at 50, a calculation is made at 54 as to the remaining useful life of the brake disk stack. This determination can be displayed on the flight deck at 56. The remaining useful life (RUL) is then passed to the decision block 58 and, if that remaining useful life is less than a first threshold, the process continues through the "DO" loop 44 for subsequent braking events.

At a point in time where the remaining useful life is less than a first threshold as determined at 58, a decision is made at 60 to order the new heat sink or heat stack. A decision is then made at 62 as to whether the remaining useful life is less than or equal to a second threshold. If it is not, the operation of the aircraft and brake continues as through the "DO" loop 40 until such time as the remaining useful life is less than or equal to a second threshold as determined at 62, at which time the heat sink replacement maintenance is actually scheduled at 64. At that time, a determination is made as to whether the remaining useful life is less than or equal to a final threshold, such as 1%. If not, operation continues. When, however, the remaining useful life is less than or equal to 1% of the original useful life of the brake stack, the determination is made at 66 to end the loop at 68, remove and replace the brake at 70, and end the real-time operation and reset the same at 72.

It will be appreciated that the invention contemplates that the flight schedule of the aircraft will be taken into account in projecting when service will be due such that the aircraft will be at an airport where brake service can be performed. Accordingly, it is contemplated that the flight schedule of the aircraft may be modified to maximize the useful life of the heat sink in order to ensure that the aircraft is at a service facility when decision block 66 is effected.

In light of the foregoing, it should be appreciated that the present invention significantly advances the art by providing an aircraft brake condition diagnosis and prognosis system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of diagnosis and prognosis for aircraft brakes, comprising:
    establishing a model of an aircraft brake by attributing brake wear factor values to various parameters, derived from both brake performance data and environmental condition data, associated with the aircraft brakes and periodically adjusting said model by comparing estimated wear derived from the summing of magnitudes of said brake wear factor values with actual wear derived by monitoring positions of wear pins;
    summing magnitudes of said brake wear factor values over a course of time during which actual in-use braking events occur;
    keeping a running total sum of said brake wear factor values;
    providing a first indicia of service necessity when said running total sum exceeds a first threshold; and
    wherein said brake performance data is taken from a group comprising the parameters of brake pressure, brake temperature, wheel speed, aircraft lateral acceleration, pilot brake pedal position/angle, park status, and thrust reverser status, said environmental condition data is taken from the group comprising the parameters of airport identification codes, date, and time, and weather conditions and the presence or absence of external factors at an airport, including use of oxidizing agents, are derived from said airport identification code, date, and time, and wherein said brake wear factor values are derived from said parameters of said groups being weighted as to their individual impacts on brake wear.

2. The method of diagnosis and prognosis for aircraft brakes as recited in claim 1, wherein said oxidizing agents include de-icing fluid causing catalytic weight loss in carbon disc heat sinks.

3. The method of diagnosis and prognosis for aircraft brakes as recited in claim 1, which further includes the step of extrapolating said running total sum of said brake wear factor values to project when brake thickness will be small enough to require brake service.

4. The method of diagnosis and prognosis for aircraft brakes as recited in claim 3, wherein said first threshold is indicative of a time at which a new or replacement heat stack for the aircraft brake should be ordered or requested.

5. The method of diagnosis and prognosis for aircraft brakes as recited in claim 4, wherein a second indicia of service necessity is provided when said running total exceeds a second threshold, said second indicia correlating with a need for immediate heat stack replacement.

6. The method of diagnosis and prognosis for aircraft brakes as recited in claim 1, wherein said parameters of said groups are further weighted as a function of parameters taken from the group of ambient temperature, aircraft mass, and aircraft speed.

7. The method of diagnosis and prognosis for aircraft brakes as recited in claim 6, wherein at least certain of said parameters are taken from a flight data recorder.

* * * * *